(12) United States Patent
Hoshi et al.

(10) Patent No.: US 7,918,571 B2
(45) Date of Patent: Apr. 5, 2011

(54) LIGHT-TRANSMITTING FILM, METHOD OF FORMING LIGHT-TRANSMITTING FILM, AND LIQUID CRYSTAL DISPLAY

(75) Inventors: Mitsunari Hoshi, Miyagi (JP); Kei Obata, Miyagi (JP); Akihiro Horii, Miyagi (JP); Hiroshi Mizuno, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/754,270

(22) Filed: Apr. 5, 2010

(65) Prior Publication Data

US 2010/0188608 A1    Jul. 29, 2010

Related U.S. Application Data

(63) Continuation of application No. 11/718,964, filed as application No. PCT/JP2006/318276 on Sep. 14, 2006, now Pat. No. 7,712,908.

(30) Foreign Application Priority Data

Sep. 15, 2005 (JP) ................................ 2005-267816
Mar. 22, 2006 (JP) ................................ 2006-079202
Sep. 7, 2006 (JP) ................................ 2006-243138

(51) Int. Cl.
*F21V 9/14* (2006.01)
(52) U.S. Cl. .......... 362/19; 362/600; 362/612; 362/607; 362/330; 362/640
(58) Field of Classification Search ............ 362/19, 362/600–634
See application file for complete search history.

(56) References Cited

U.S. PATENT DOCUMENTS

| 5,808,794 | A  | 9/1998 | Weber et al.    |
|-----------|----|--------|-----------------|
| 5,828,488 | A  | 10/1998| Ouderkirk et al.|
| 6,018,419 | A  | 1/2000 | Cobb, Jr. et al.|
| 6,025,897 | A  | 2/2000 | Weber et al.    |
| 6,088,159 | A  | 7/2000 | Weber et al.    |
| 6,449,092 | B1 | 9/2002 | Weber et al.    |
| 6,515,785 | B1 | 2/2003 | Cobb, Jr. et al.|

(Continued)

FOREIGN PATENT DOCUMENTS

JP    08-166582    6/1996

(Continued)

*Primary Examiner* — Sandra L O Shea
*Assistant Examiner* — Jessica L McMillan
(74) *Attorney, Agent, or Firm* — K&L Gates LLP

(57) ABSTRACT

A light-transmitting film that has a predetermined polarization split function, in addition to a light-collecting function is provided. The index of refraction nx in a prism extension direction and the index of refraction in a prism alignment direction differ from each other. By generating a difference in the indices of refraction in the prism extension direction and the prism alignment direction orthogonal thereto, for the light incident on the light-transmitting film, the polarization component Lx oscillating in the prism extension direction and the polarization component Ly oscillating in the prism alignment direction can have different transmission characteristics. For example, by setting the index of refraction in the prism extension direction greater than the index of refraction in the prism alignment direction (nx>ny), among the light incident on the light-transmitting film, the amount of return light of the polarization component Lx oscillating in the prism extension direction is greater than that of the polarization component Ly oscillating in the prism alignment direction. In this way, not only a light-collecting function, but also a predetermined polarization split function is obtained.

20 Claims, 18 Drawing Sheets

U.S. PATENT DOCUMENTS

| | | |
|---|---|---|
| 6,543,153 B1 | 4/2003 | Weber et al. |
| 6,646,802 B2 | 11/2003 | Yamamoto |
| 6,760,157 B1 | 7/2004 | Allen et al. |
| 6,804,058 B1 * | 10/2004 | Ouderkirk et al. ............ 359/494 |
| 6,846,089 B2 * | 1/2005 | Stevenson et al. ............ 362/627 |
| 7,038,745 B2 | 5/2006 | Weber et al. |
| 7,418,188 B2 | 8/2008 | Winston et al. |
| 7,424,197 B2 | 9/2008 | Winston et al. |
| 2002/0044354 A1 | 4/2002 | Yamamoto |
| 2006/0138702 A1 | 6/2006 | Biernath et al. |
| 2006/0141218 A1 | 6/2006 | Biernath et al. |
| 2006/0141220 A1 | 6/2006 | Merrill et al. |
| 2006/0204720 A1 | 9/2006 | Biernath et al. |
| 2006/0274244 A1 | 12/2006 | Battiato et al. |

FOREIGN PATENT DOCUMENTS

| | | |
|---|---|---|
| JP | 2001-166116 | 6/2001 |
| JP | 2002-031716 | 1/2002 |
| JP | 2002-182039 | 6/2002 |
| JP | 2004-198725 | 7/2004 |
| JP | 2004-198958 | 7/2004 |
| JP | 2004-279506 | 10/2004 |
| JP | 2005-17355 | 1/2005 |
| JP | 2006-078917 | 3/2006 |
| KR | 2005-68874 | 7/2005 |

* cited by examiner

FIG. 4
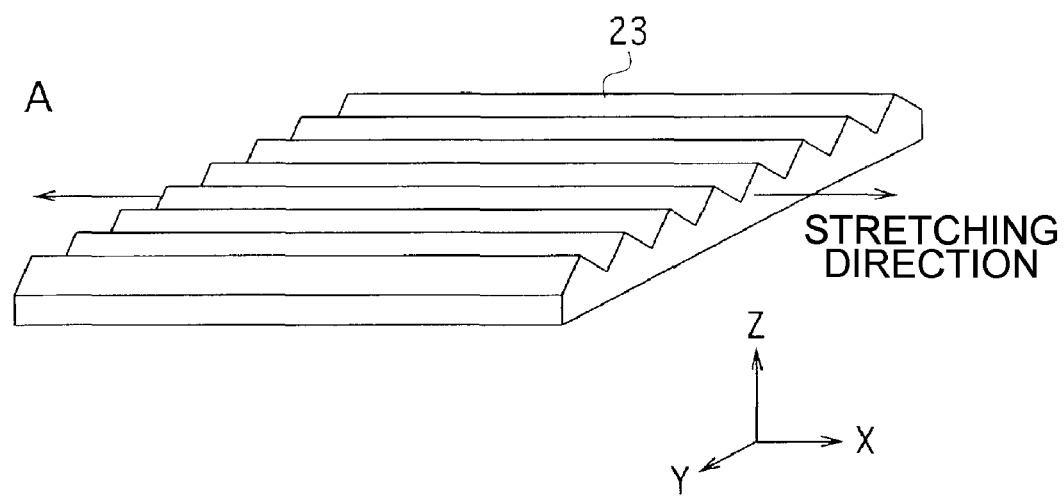
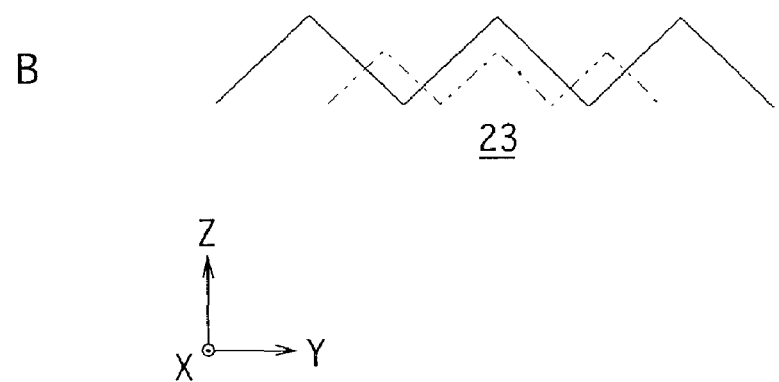

FIG. 5
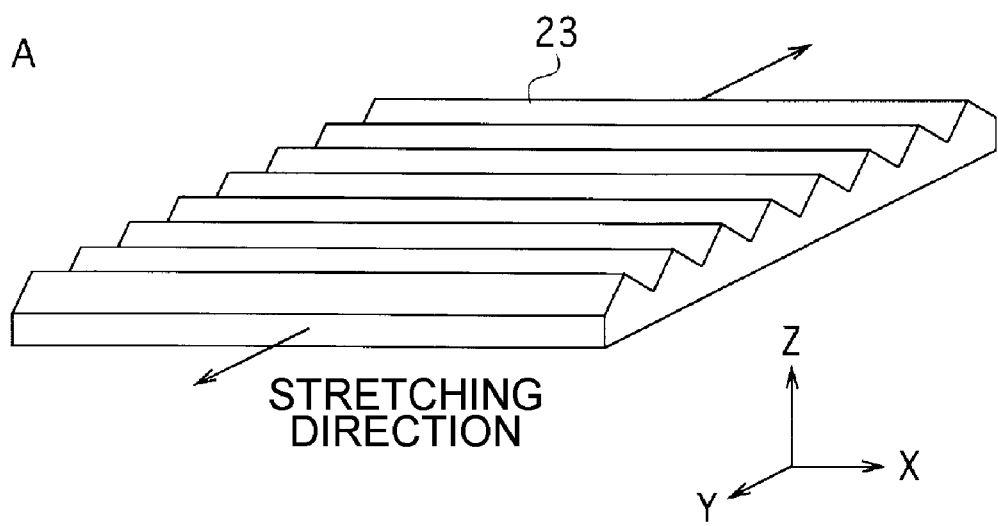
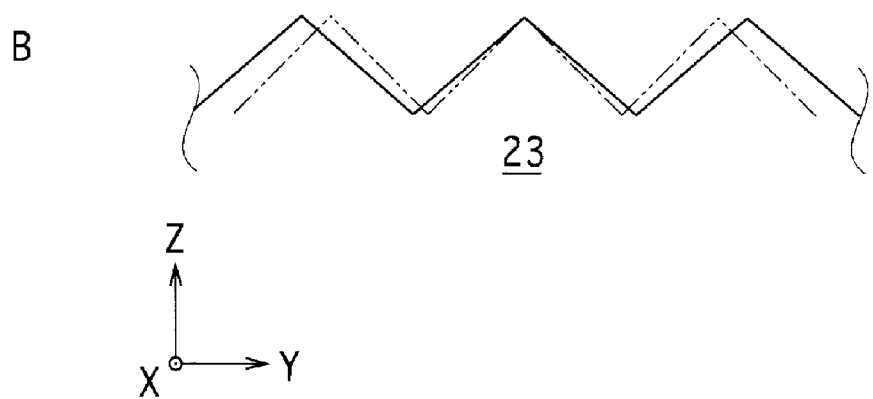

LIGHT-TRANSMITTING FILM, METHOD OF FORMING LIGHT-TRANSMITTING FILM, AND LIQUID CRYSTAL DISPLAY

CROSS REFERENCES TO RELATED APPLICATIONS

The present application is a continuation of U.S. patent application Ser. No. 11/718,964 filed on May 9, 2007, which is a National Stage of International Application No. PCT/JP2006/318276 filed on Sep. 14, 2006, which claims priority to Japanese Patent Applications JP 2005-267816 filed on Sep. 15, 2005, JP 2006-079202 filed on Mar. 22, 2006, and JP 2006-243138 filed on Sep. 7, 2006, the entire contents of which are being incorporated herein by reference.

BACKGROUND

The present disclosure relates to a light-transmitting film including continuously aligned three-dimensional structures on one of the surfaces, a method of forming the light-transmitting film, and a liquid crystal display.

Liquid crystal displays (LCDs) consume less electric power and can be formed small and thin compared with cathode ray tubes (CRTs). Recently, liquid crystal displays of various sizes are put to use, such as small devices including mobile phones, digital cameras, personal digital assistants (PDAs) and large devices including liquid crystal televisions.

Liquid crystal displays are divided into transmissive types and reflective types. A transmissive liquid crystal display includes a liquid crystal display panel formed by sandwiching a liquid crystal layer with a pair of transparent substrates, first and second polarizers disposed on the light incident side and the light emission side, respectively, of the liquid crystal display panel, and a backlight unit that functions as an illumination light source. The backlight unit may be a direct light type in which a light source is disposed directly below the liquid crystal display panel or an edge light type that uses a light-guiding plate.

To collect the light emission direction of light from the light source to front side, a configuration is known in which a light-transmitting film known as a luminance improvement film is interposed between the backlight unit and the liquid crystal display panel (for example, refer to Japanese Patent No. 3158555). The luminance improvement film is made of a prism sheet having prisms with triangular cross-sections periodically aligned at a fine pitch on a first side and collects light by vertically emitting the light from the backlight to the front side.

However, since with a known prism sheet, the index of refraction is isotropic and the light emitted from the prism sheet is usually not polarized, about half of the light emitted from the prism sheet is absorbed by the first polarizer disposed on the light incident side of the liquid crystal display panel. Consequently, there is a problem in that the illumination light from the backlight cannot be used efficiently and luminance cannot be improved.

By interposing a reflective polarizer that transmits a first linearly polarized component and reflects a second linearly polarized component between the prism sheet and the liquid crystal display panel, light efficiency of the backlight can be increased and the luminance can be improved.

However, by using such a reflective polarizer, the production cost of the liquid crystal display apparatus increases and the number of components increases. Thus, it becomes difficult to reduce and size and thickness of the apparatus. Moreover, even when a reflective polarizer is used, the function is not necessarily sufficient in that, for example, part of the polarized component in the absorption axis direction of the first polarizer leaks.

SUMMARY

The present application provides a light-transmitting film that has both a light-collecting function and a predetermined polarization split function, a method of forming a light-transmitting film, and a liquid crystal display apparatus.

The light-transmitting film according to an embodiment includes a three-dimensional structure disposed continuously on a first surface, and the index of refraction in the extension direction of the three-dimensional structure and the index of refraction in the alignment direction of the three-dimensional structure differ.

By setting a difference in the index of refraction in the extension direction of the three-dimensional structure and the index of refraction in the alignment direction orthogonal thereto, for light incident on the light-transmitting film, different transmission characteristics can be provided to the polarization component oscillating in the three-dimensional structure extension direction and the linear polarization component oscillating in the three-dimensional structure alignment direction. The difference in the transmission characteristics of the polarization components becomes greater as the difference in the indices of refraction in the extension direction of the three-dimensional structure and the alignment direction becomes greater.

The extension direction of the three-dimensional structure is not limited to one direction. The extension directions of the three-dimensional structure may be differed to that a plurality of extension directions are two-dimensionally arranged. Furthermore, the three-dimensional structure according an embodiment includes a structure such as a prism or a lenticular lens. The prism is formed with, for example, a cross-sectional shape of triangles having a 90° (degrees) apex angle.

In the above-described configuration, for example, by setting the index of refraction in the extension direction of the prism greater than the index of refraction in the alignment direction of the prism, for the light incident on the light-transmitting film, the amount of return light of the polarization component oscillating in the extension direction of the prism is greater than that of the polarization component oscillating in the alignment direction of the prism.

The light-transmitting film according to an embodiment having refraction anisotropy in the extension direction and the alignment direction of the three-dimensional structure is formed by carrying out a step of forming a resin film having the three-dimensional structure on the first surface; and a step of stretching the resin film in an extension direction of the three-dimensional structure and generating a difference in the index of refraction in the extension direction of the three-dimensional structure and the index of refraction in the alignment direction of the three-dimensional structure.

The stretching direction of the resin film is set to the extension direction of the three-dimensional structure to reduce the change in the optical characteristic due to the change in the shape of the prism before and after stretching. When the index of refraction in the extension direction is set greater than the index of refraction in the alignment direction of the three-dimensional structure, it is preferable to select a material that has a great index of refraction in the extension direction for the structuring material of the light-transmitting film. For example, a material that has a great index of refraction in the stretching direction includes co-polymers such as polyethylene terephthalate (PET), polyethylene naphthalate (PEN), a PET-PEN mixture, or a PET-PEN co-polymer, polycarbonate, polyvinyl alcohol, polyester, polyvinylidene fluoride, polypropylene, and polyamide.

When the index of refraction in the alignment direction is set greater than the index of refraction in the extension direction of the three-dimensional structure, it is preferable to select a material that has a small index of refraction in the stretching direction as the structuring material of the light-transmitting film. A material that has a small index of refraction in the stretching direction includes, for example, methacrylic resin, polystyrene-based resin, styrene-methyl methacrylate co-polymer, and a mixture thereof.

When the light-transmitting film according to an embodiment is used as a luminance-improvement film for a liquid crystal display apparatus, either one of the following two structures may be employed. As a first structure, the light-transmitting film is formed so that the index of refraction in the extension direction of the three-dimensional structure is greater than the index of refraction in the alignment direction and the angle formed by the alignment direction of the three-dimensional structure and the light-transmission axis of the polarizer, among the pair of polarizers, disposed on the light incident side of the liquid crystal display panel set from 0° to 45°. For a second structure, the light-transmitting film is formed so that the index of refraction in the alignment direction of the three-dimensional structure is greater than the index of refraction in the extension direction and the angle formed by the extension direction of the three-dimensional structure and the light-transmission axis of the polarizer, among the pair of polarizers, disposed on the light incident side of the liquid crystal display panel set from 0° to 45°.

By such a structure, the emission light from the light-transmitting film can be efficiently emitted at the liquid crystal display panel. Therefore, the backlight beams can be used efficiently, and the luminance of the liquid crystal display apparatus can be improved.

As described above, with the light-transmitting film according to an embodiment, since the extension direction of the three-dimensional structure and the alignment direction have anisotropy in the indices of refraction, not only a light-collecting effect, but also a predetermined polarization split effect can be achieved. Therefore, without using optical elements, such as a reflective polarizer, the luminance improvement effect of the liquid crystal display apparatus can be increased, and the number of components and production cost can be decreased.

BRIEF DESCRIPTION OF THE FIGURES

FIG. 4 is schematic view illustrating a method of forming the prism according to the present invention, where FIG. 4A illustrates the stretching direction and FIG. 4B illustrating the change in the prism shape before and after stretching.

FIG. 5 illustrates the change in the prism shape when stretching is carried out in a direction different from that in FIG. 4.

DETAILED DESCRIPTION

Embodiments are described below with reference to the drawings.

Figure 1:
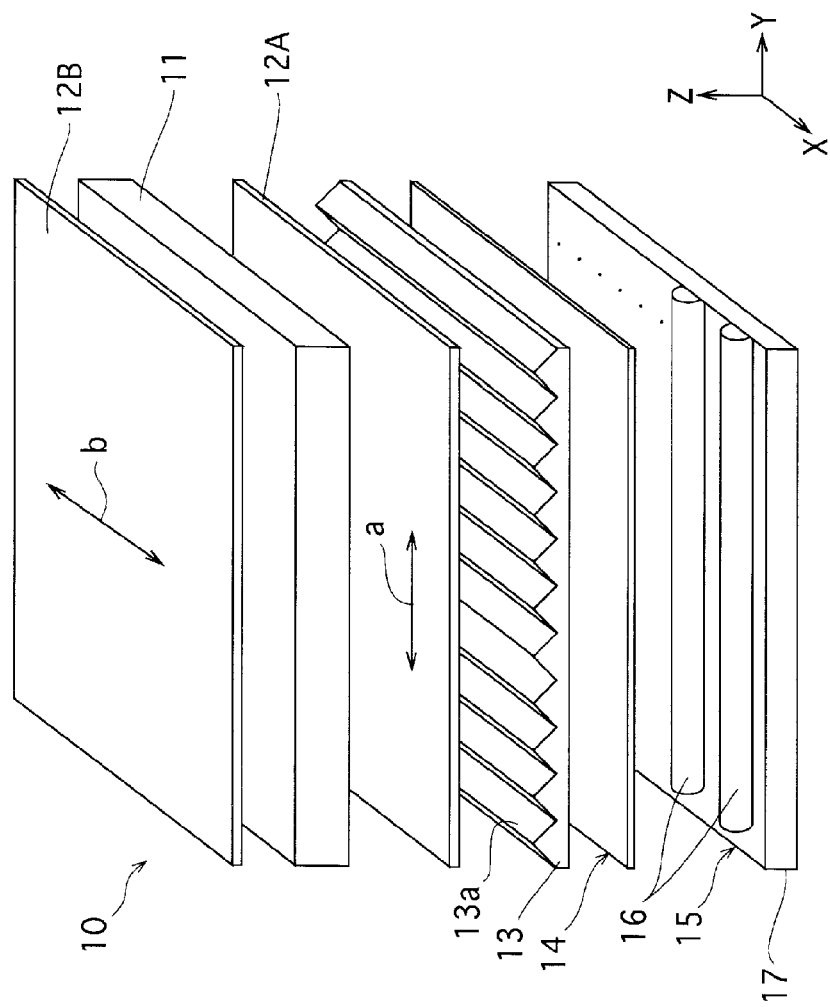
FIG. 1 is an exploded perspective view illustrating the overall structure of a liquid crystal display apparatus according to an embodiment.

FIG. 1 is a schematic view of a liquid crystal display apparatus 10 including a light-transmitting film according to an embodiment. First, the overall structure of the liquid crystal display apparatus 10 is briefly described.

The liquid crystal display apparatus 10 includes a liquid crystal display panel 11, a first polarizer 12A and a second polarizer 12B sandwiching the liquid crystal display panel 11, a prism sheet 13, a diffuser 14, and a backlight unit 15.

The liquid crystal display panel 11 has a structure in which a liquid crystal layer is interposed between a pair of transparent substrates. According to this embodiment, liquid crystal material for a driving mode having an excellent viewing angle characteristics, such as vertical alignment (VA) and in-plane switching (IPS). However, it is also possible to employ a twist nematic type liquid crystal material.

The first polarizer 12A is a polarizer disposed on the light incident side of the liquid crystal display panel 11, and the second polarizer 12B is a polarizer disposed on the light emission side of the liquid crystal display panel 11. The orientation of a transmission axis a of light is determined in accordance with the relationship between the magnitudes of the index of refraction in the alignment direction of the prisms on the prism sheet 13 (hereinafter this is referred to as the "prism alignment direction") and the index of refraction in the extension direction of the prisms (hereinafter this is referred to as the "prism extension direction").

For example, when the index of refraction of the prism extension direction is greater than the index of refraction of the prism alignment direction, the effect is maximized when the direction of the transmission axis a of light of the first polarizer 12A is set to the prism alignment direction, as shown in FIG. 1. However, when the direction of the transmission axis a and the prism alignment direction cannot be matched due to reasons such as obtaining a suitable angular luminance distribution or improving the contrast ratio of the liquid crystal display panel 11, the angle formed by the transmission axis a and the prism alignment direction may be increased. In such a case, to improve the front luminance, the angle must be between 0° to 45° and more preferably should be between 0° to 20°.

When the index of refraction of the prism alignment direction is greater than the index of refraction of the prism extension direction, the effect is maximized when the direction of the transmission axis a of the first polarizer 12A is set to the prism extension direction. However, when the direction of the transmission axis a and the prism extension direction cannot be matched due to reasons such as obtaining a suitable angular luminance distribution or improving the contrast ratio of the liquid crystal display panel 11, the angle formed by the transmission axis a and the prism extension direction may be increased. In such a case, to improve the front luminance, the angle must be between 0° to 45° and more preferably should be between 0° to 20°.

The prism sheet 13 corresponds to the light-transmitting film according to an embodiment and is used as a luminance improvement film for improving the front luminance of the liquid crystal display apparatus 10. The prism sheet 13 is disposed on the light emission side of the diffuser 14 that diffuses and emits illumination light (hereinafter also referred to as "backlight beams") from the backlight unit 15 and, as described below, has a collecting function and a predetermined polarization split function.

The backlight unit 15 is configured as a direct light type including a plurality of linear light sources 16 and a reflector 17. However, the backlight unit 15 is not limited thereto and may be configured as a side-edge type using a light-guiding plate. The light sources 16 are linear light sources, such as cold cathode fluorescent lamps (CCFLs). Instead, however, point light sources, such as light emitting diodes (LEDs) may be used.

Next, the prism sheet 13 provided as the light-transmitting film according to an embodiment is described in detail.

Figure 2:
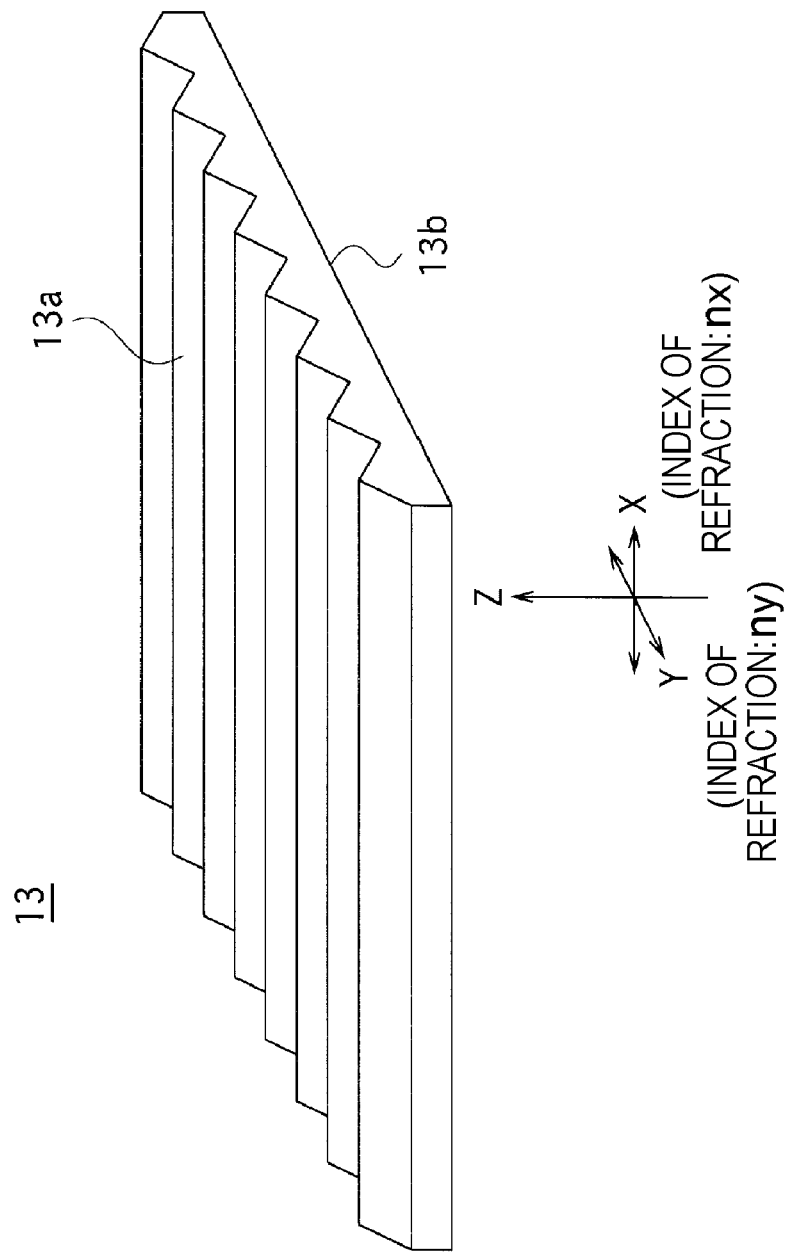
FIG. 2 is an overall perspective view schematically illustrating the structure of a prism sheet provided as a light-transmitting film according to an embodiment.

FIG. 2 is a schematic view of the entire structure of the prism sheet 13. The prism sheet 13 is made of light-transmitting resin material and has, on a first side, a prism structure surface 13a on which uniform columnar prisms having triangular cross-sections are continuously aligned in a first direction (Y direction). The prisms included in the prism structure surface 13a correspond to the "three-dimensional structures" according to the present invention and are each formed with the same apex angle and pitch. According to this embodiment, the prism apex angle is 90°, and the alignment pitch is, for example, 50 μm. A second side of the prism sheet 13 is a flat surface 13b. The prism structure surface 13a of the prism sheet 13 is disposed facing the light emission side (liquid crystal display panel 11 side).

Figure 3:
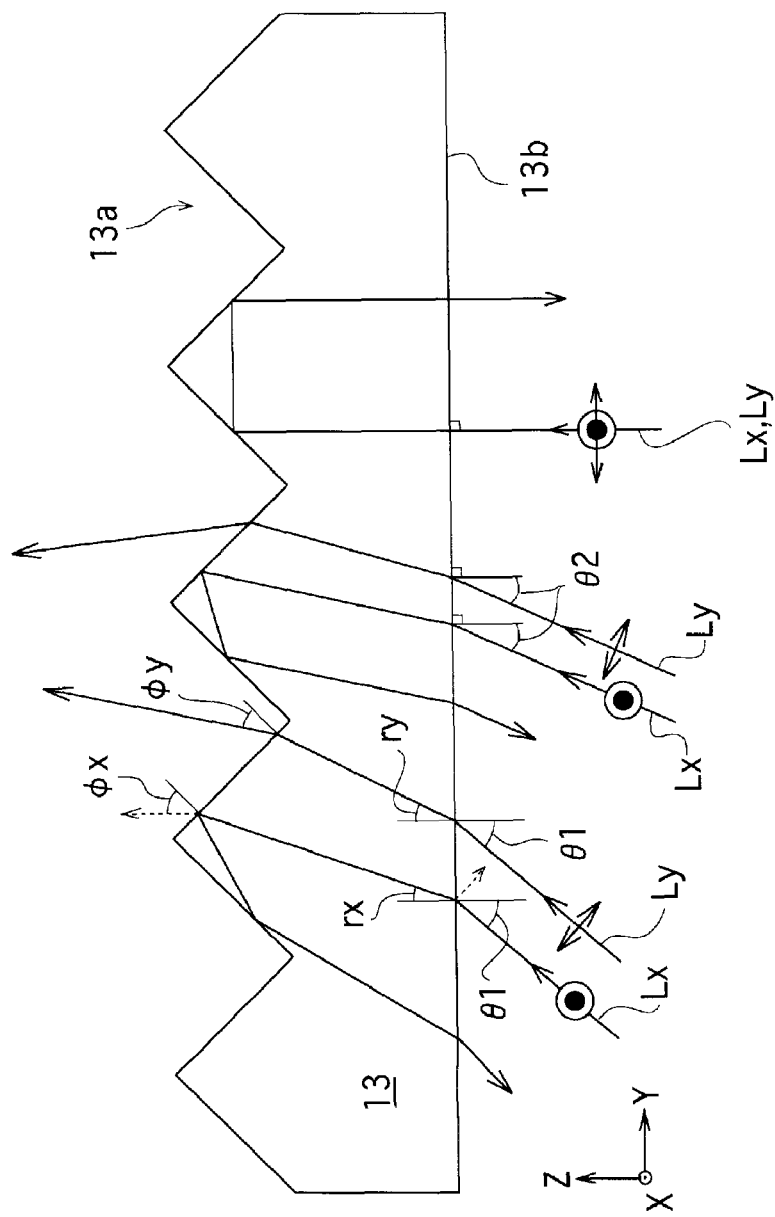
FIG. 3 is a cross-sectional view of main parts illustrating an effect of the prism sheet according to an embodiment.

The prism sheet 13 has different indices of refraction in the prism extension direction (X direction) and the prism alignment direction (Y direction). In this way, since the prism sheet 13 has indices of refraction with in-plane anisotropy, the transmitting characteristic of the light incident on the prism sheet 13 can be changed in accordance with the polarization state. FIG. 3 illustrates the path of the light incident on the prism sheet 13 and, in particular, illustrates a case in which the index of refraction nx in the prism extension direction is greater than the index of refraction in the prism alignment direction (nx>ny). Here, Lx represents a polarization component of a backlight beam L that oscillates in the prism extension direction (X direction), and Ly represents a polarization component of the backlight beam L that oscillates in the prism alignment direction (Y direction).

As shown in FIG. 3, with the backlight beam incident to the flat surface 13b of the prism sheet 13 from a diagonal direction at an incident angle $\theta 1$, since the index of refraction of the prism sheet 13 differs in the prism extension direction (X direction) and the prism alignment direction (Y direction) (nx>ny), the X-direction polarization components Lx and the Y-direction polarization components Ly of the backlight beam are refracted at different refraction angles rx and ry, respectively, (rx<ry) and are emitted from the inclined surfaces of the prism at different emission angles $\phi x$ and $\phi y$, respectively. At this time, the emission angle $\phi y$ of the polarization components Ly is smaller than the emission $\phi x$ angle of the polarization components Lx ($\phi x > \phi y$).

In the above embodiment, both of the polarization components Lx and Ly are emitted from the light emission surface (prism structure surface 13a) of the prism sheet 13. However, since the indices of refraction differ in the prism extension direction (X direction) and the prism alignment direction (Y direction 9, the oscillating polarization components in these directions are reflected at different degrees of reflection at an interface such as the flat surface 13b or the inclined surfaces of the prisms. According to this embodiment, since the index of refraction nx in the prism extension direction is greater than the index of refraction ny in the prism alignment direction, the polarization components Lx oscillating in the prism extension direction are reflected more than the Ly. As a result, with the backlight beams transmitted through the prism sheet 13, the amount of light of the Ly is greater than that of the Lx.

Since the emission angles of the polarization components Lx and Ly emitted from the inclined surfaces of the prisms have a relationship $\phi x > \phi y$, when the incident angle of a backlight beam incident on the prism sheet 13 satisfies a predetermined condition, a complete polarization split state is achieved in which the polarization components Lx are totally reflected repeatedly at the inclined surfaces of the prisms and only the polarization components Ly are transmitted through the prism sheet 13. An example of this state being achieved under the condition of an incident angle $\theta 2$ is illustrated in FIG. 3. As an example, $\theta 2$ equal approximately 11 to 25 degrees where nx=1.9, ny=1.6, and the prism apex angle equals 90 degrees.

When the incident angle of the backlight beam to the prism sheet 13 is too small, the same state as that when the backlight beam is orthogonally incident to the flat surface 13b of the prism sheet 13 is achieved. In such a case, as shown in FIG. 3, regardless of the polarization state of the backlight beam L, the backlight beam L is totally reflected repeatedly at the inclined surfaces of the prisms and becomes a return beam that returns to the side of the backlight.

As described above, by providing in-plane anisotropy to the prism sheet 13, a predetermined polarization split effect can be obtained in addition to the collecting effect of backlight beams. Furthermore, the light reflected at the prism sheet 13 according to the above-described example will be reflected at the surfaces of the reflector 17 (FIG. 1) and the diffuser 14 of the backlight unit 15 and will be incident on the prism sheet 13 again without being polarized. Therefore, light efficiency is increased, and the light can contribute to the improvement of front luminance.

Next, an example of a method of forming the prism sheet 13 that is configured as described above is described.

The prism sheet 13 according to this embodiment in formed by a step of producing a resin film having the prism structure surface 13a on the first side and a step of stretching the resin film in the prism extension direction and providing difference in the indices of refraction in the prism extension direction and the prism alignment direction.

The method of producing the resin film is not limited, and, for example, a hot press method or a melt extrusion process may be employed. Furthermore, a prism layer may be formed on a base of a flat resin sheet. It is preferable that the resin film be producible continuously using a roll.

The refraction anisotropy is added to the produced resin film by stretching the resin film in the prism extension direction. With the prism sheet 13 according to this embodiment, the index of refraction nx in the prism extension direction is greater than the index of refraction ny in the prism alignment direction. Therefore, as shown in FIG. 4A, by producing a resin film 23 using resin material having a great index of refraction in the stretching direction and then stretching the resin film 23 in the prism extension direction (X direction), the target prism sheet 13 is obtained. The stretching rate can be set appropriately in accordance with the required in-plane difference in the indices of refraction and the type of the resin film material.

Resin material that has a great index of refraction in the stretching direction includes co-polymers such as polyethylene terephthalate (PET), polyethylene naphthalate (PEN), a mixture thereof, or a PET-PEN co-polymer, polycarbonate, polyvinyl alcohol, polyester, polyvinylidene fluoride, polypropylene, and polyamide.

The stretching direction is set to the prism extension direction so as to suppress a change in the target optical characteristic caused by a change in the prism shape before and after stretching. FIG. 4B illustrates a change in the external shape of the prism structure surface before and after stretching, where the solid line represents before stretching and the single dotted line represents after stretching. By setting the stretching direction to the prism extension direction (X direction), the cross-sectional shape of the prism after stretching is in a substantially scaling relationship with the cross-sectional shape of the prism before stretching. Therefore, change in the optical characteristic can be suppressed, and the desired prism shape can be controlled at high accuracy.

In contrast, as shown in FIGS. 5A and 5B, by adding refraction anisotropy to the resin film 23 by stretching it in the prism alignment direction (Y direction), the change in the external shape of the prism changes greatly, where in particular the prism apex angle and prism alignment pitch increase, and it becomes difficult to control the desired optical characteristic in a highly accurate manner. In FIG. 5B, the double-dotted chain line represents before stretching and the solid line represents after stretching.

To set the index of refraction in the prism alignment direction greater than the index of refraction in the prism extension direction, resin material that has a small index of refraction in the stretching direction may be used and then stretched in the prism extension direction. Resin material having a small index of refraction in the stretching direction includes methacrylic resin such as methacrylate, polystyrene resin, styrene-acrylonitrile co-polymer (AS resin), styrene-methacrylate co-polymer, and mixtures thereof.

Figure 6:
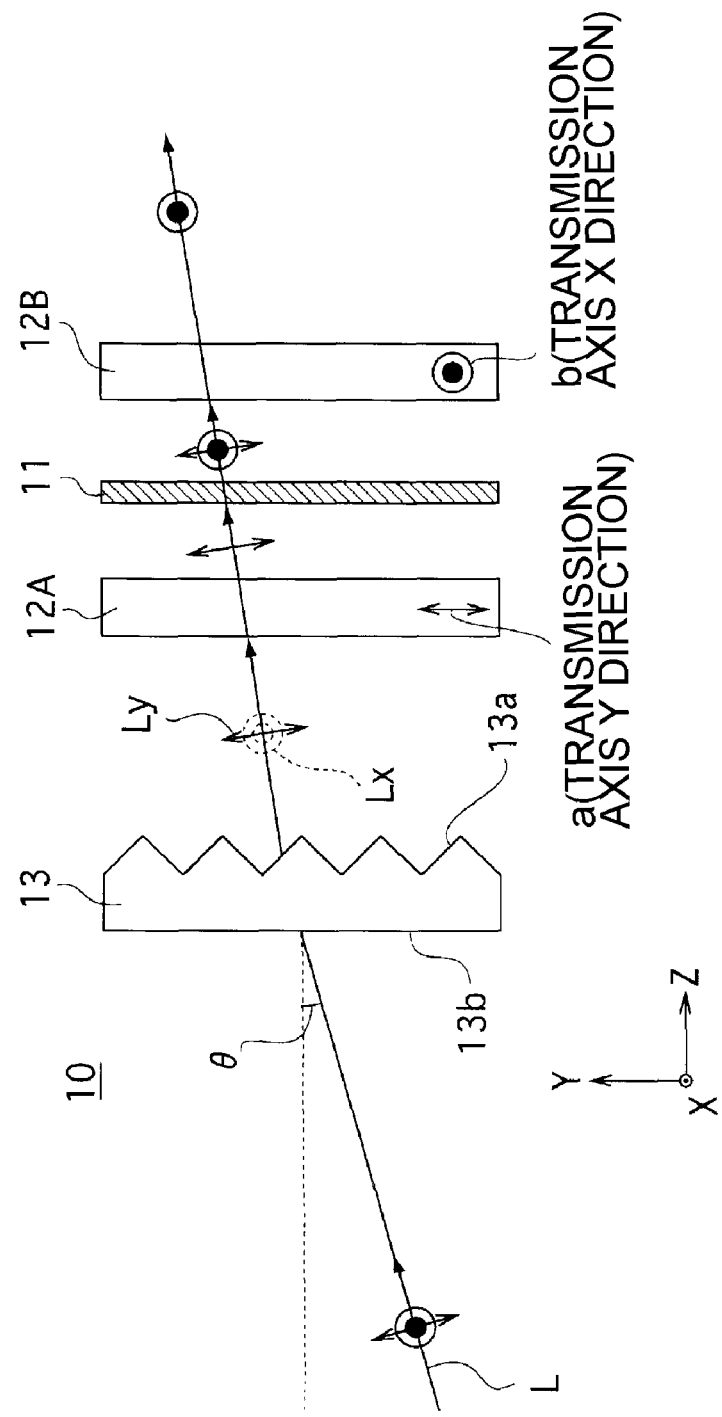
FIG. 6 is a side view of main parts illustrating an effect of the liquid crystal display apparatus illustrated in FIG. 1.

Next, the operation of the liquid crystal display apparatus 10 according to this embodiment is described with reference to FIG. 6. FIG. 6 is an overall side view of the liquid crystal display apparatus 10 illustrating the polarization state of light transmitted through the prism sheet 13, the first polarizer 12A, the liquid crystal display panel 11, and the second polarizer 12B.

As described above, the transmission axis a of the first polarizer 12A is determined in accordance with the magnitude of the relationship between the magnitudes of the index of refraction in the prism alignment direction and the index of refraction of the stretching direction in the prism extension direction. FIG. 6 illustrates a case in which the index of refraction in the prism extension direction is greater than the index of refraction in the prism alignment direction, where it is preferable to dispose the transmission axis a of the first polarizer 12A in the prism alignment direction (Y direction). In FIG. 6, Lx represents a polarization component in the backlight beam L oscillating in the prism extension direction (X direction) and Ly represents a polarization component in the backlight beam L oscillating in the prism alignment direction (Y direction).

Non-polarized light (backlight beam L) that is emitted from the backlight unit 15, not shown in the drawing, and that is transmitted through the diffuser 14 is incident on the flat surface 13b of the prism sheet 13. The backlight beam L is collected toward the front direction at the prism sheet 13, emitted from the prism structure surface 13a, and then incident on the first polarizer 12A. The first polarizer 12A absorbs the Lx and transmits the Ly of the incident backlight beam L. The Ly transmitted through the first polarizer 12A is polarized by each pixel unit at the liquid crystal display panel 11 and is incident on the second polarizer 12B. Only polarized light of the transmitting axis of the second polarizer 12B is transmitted so as to form an image on the front surface of the panel.

The incident angle θ of the backlight beam L incident on the prism sheet 13 is not constant and has a predetermined angle distribution. The prism sheet 13 according to this embodiment is formed such that the index of refraction nx in the prism extension direction is greater than the index of refraction ny in the prism alignment direction. Therefore, as described with reference to FIG. 3, with the backlight beam L transmitted through the prism sheet 13, the amount of Lx is greater than that of Ly. The quantitative proportion depends on the difference between the index of refraction in the prism alignment direction of the prism sheet 13 and the index of refraction in the prism extension direction and the distribution of the incident angle θ of the backlight beam L incident on the prism sheet 13.

Part of the backlight beam L reflected at the prism sheet 13 is reflected at the surface of the diffuser 14 or the reflector 17 of the backlight unit 15 and is incident on the prism sheet 13 again. Such a recycling effect is repeated to efficiently use the backlight beam L.

According to this embodiment described above, since the prism sheet 13 not has only a light collecting effect but also has a predetermined polarization split effect, the amount of emitted light of the polarization components Lx of the backlight beam L in the prism extension direction can be reduced more than the amount of emitted light of the polarization components Ly in the prism alignment direction. Thus, the amount of the backlight beam L absorbed at the first polarizer 12A can be reduced so as to efficiently use the backlight beam L. In this way, the extraction efficiency of the backlight beam L is increased, and the front luminance is improved.

Moreover, since an expensive optical element, such as reflective polarizer, will not necessarily be required, the thickness of the liquid crystal display apparatus can be further reduced by reducing the number of components, and the production cost can be reduced.

Figure 7:
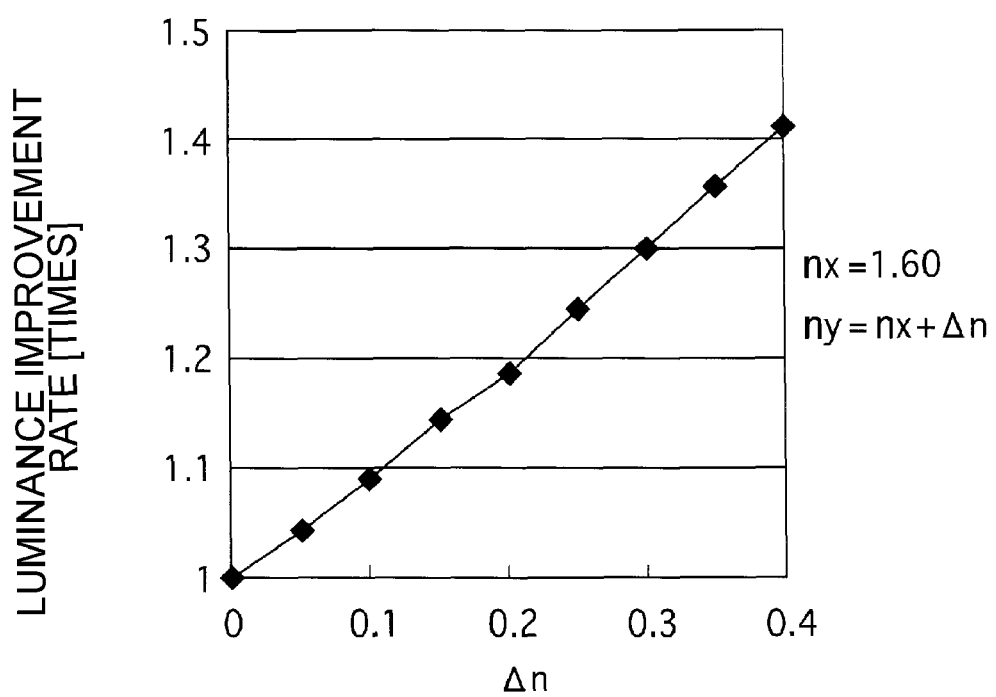
FIG. 7 illustrates the relationship between the magnitude of the difference in in-plane index of refraction of the prism sheet according to an embodiment and the luminance-improvement rate.

The polarization split effect of the backlight beam L by the prism sheet 13 is greater as the difference of the index of refraction nx in the prism extension direction and the index of refraction ny in the prism alignment direction increases. FIG. 7 illustrates a case in which the index of refraction ny in the prism alignment direction is greater than the index of refraction nx in the prism extension direction and illustrates a simulation result of the luminance improvement rate when nx=1.60 and ny=nx+Δn. This shows how much the luminance improves when a case in which the birefringence Δn is set to zero is set as a reference. Here, the prism apex angle is 90°.

As it is apparent from FIG. 7, the great Δn is, the greater the luminance improvement rate is. Since the angular luminance distribution is determined by nx, the value can be appropriately determined by product design. In contrast, the greater ny is than nx, the more preferable it is, and in this way, the luminance improvement rate can be increased.

An embodiment has been described above. However, it should be appreciated that various modifications may be employed within the spirit and scope of the present disclosure.

For example, in the above-described embodiment, the in-plane index of refraction of the prism sheet 13 is set to nx>ny. Instead, however, this may be set to nx<ny. In such a case, resin material that has a small index of refraction in the stretching direction when it is stretched in the prism extension direction may used. Also, in such a case, it is preferable that the prism alignment direction be a direction orthogonal to the transmission axis of the first polarizer.

Furthermore, in the above-described embodiment, one prism sheet 13 is used. However, two overlapping prism sheets 13 may be used. In such a case, it is preferable that the sheets be stacked so that the prism extension directions of the sheets are orthogonal to each other and so that the index of refraction in the prism extension direction of one prism sheet is great and the index of refraction in the prism alignment direction of the other sheet is great. Instead, the prism sheet on the top may be a prism sheet with a difference in the index of refraction and the prism sheet on the bottom may be a standard isotropic prism sheet (for example, BEF (trademark) manufactured by 3M Company).

In addition, according to the above-described embodiment, stretching is employed to generate refraction anisotropy in the prism sheet 13. However, it should be appreciated that the refraction anisotropy may be generated in the prism extension direction and the prism alignment direction by, for example, aligning liquid crystal material having refraction anisotropy or forming a prism sheet using crystalline material having refraction anisotropy.

EXAMPLES

Examples of the present embodiments are described below. In the examples described below, in some cases, a prism sheet having refraction anisotropy according to the present invention may be referred to as an "anisotropic prism sheet."

First Example

Forming Prism Sheet

As an original metal embossed plate for hot press for transferring the prism shape to the resin film, a plate was used with surface engraved in a manner such that the cross-section includes right isosceles triangles, with apex angles of 90 degrees, regularly and continuously arranged adjacent and parallel to each other so that the distance between a projecting portion and an adjacent projecting portion and the distance between a concave portion and an adjacent projecting portion are both 50 μm. The resin film was thermoplastic resin, and a 200-μm thick amorphous PET (A-PET) sheet (NovaClear (trademark) SG007 manufactured by Mitsubishi Chemical Corporation, Tg approximately 70° C.) was used. This resin film was hot pressed at 100° C. for 10 minutes at 100 kgf/cm2 (9.8 Mpa), and immediately after pressing, ice water was added to obtain a transparent isotropic prism sheet.

[Stretching Prism Sheet]

The obtained isotropic prism sheet was cut into an 8 cm long (in the prism extension direction) and 5 cm wide rectangle. Then, the triangular cross-sections (prism cross-sections) at both edges in the longitudinal direction were held with a manual stretching machine, and an anisotropic prism sheet was obtained by carrying out uniaxial stretching at a stretching speed of 1 cm/sec so that the center of the sample is stretched in the stretching by 3.5 times in 55° C. warm water.

The triangular cross-sections of the obtained anisotropic prism sheet and the unstretched isotropic prism sheet were measured using a surface roughness meter (Surfcoder ET4001A manufactured by Kosaka Laboratory Ltd.). As a result, both sheets included right isosceles triangles having a 45-degrees base angle that is the same as the original plate. Furthermore, the prism of the sample before stretching was approximately a 50 μm pitch, which is the same as the original plate, whereas the prism sample after stretching was approximately a 30 μm pitch.

Figure 8:
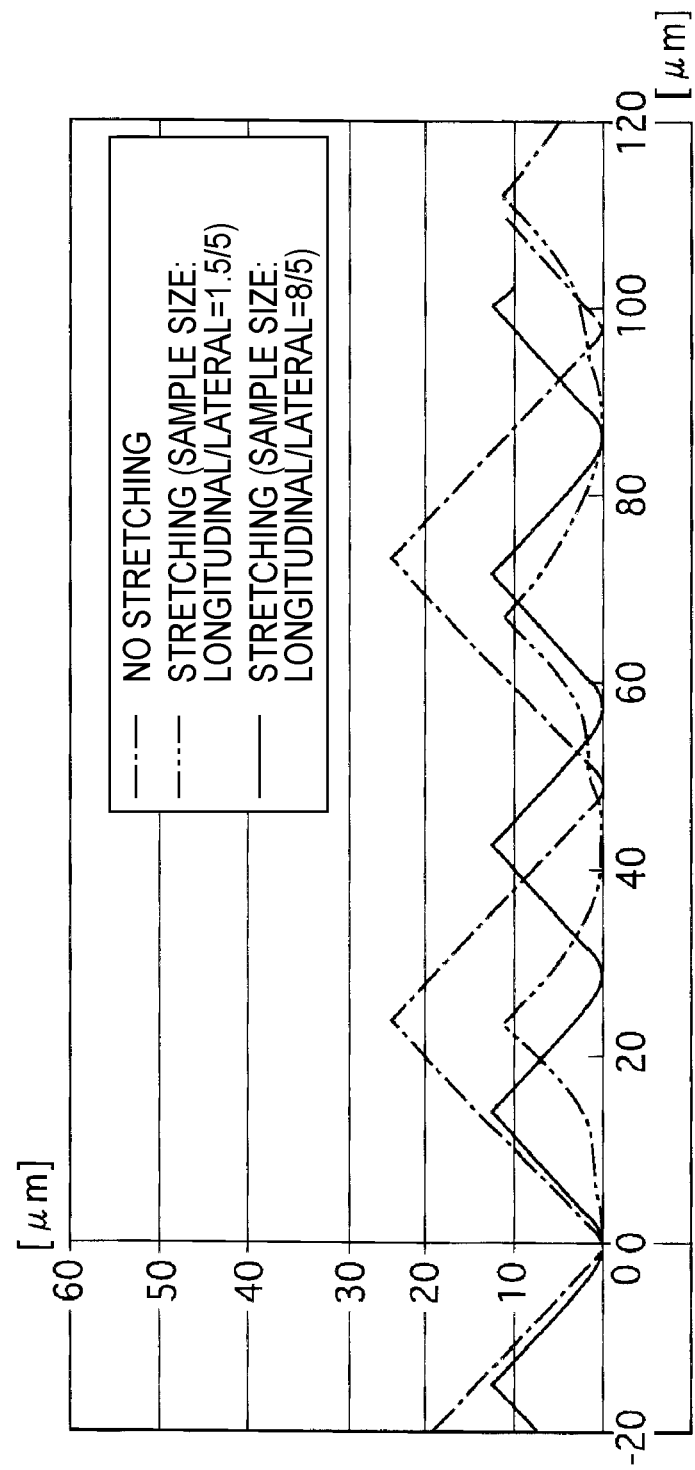
FIG. 8 illustrates the result of measuring the cross-sectional shape of an anisotropic prism sheet described in a first example according to an embodiment.

FIG. 8 illustrates a schematic cross-sectional view of the prism sheet after stretching. In the drawing, the chain dotted line represents the cross-sectional shape of the sample before stretching, and the solid line represents the cross-sectional shape of the sample after stretching. It can be noticed that the shapes of the prism are similar before and after stretching.

The chain double-dotted line represents the shape of the prism after the sample cut into 1.5 cm long and 5 cm wide shapes in the longitudinal direction (prism extension direction). As shown in the example, when a sample having a longitudinal/horizontal ratio less the one is stretched in the longitudinal direction, the cross-sectional shape of the sheet is deformed, and a prism shape similar to the original cannot be obtained. Therefore, it is preferable to cut out the sample so that the longitudinal/horizontal ratio is one or greater.

[Measurement of Birefringence]

Figure 9:
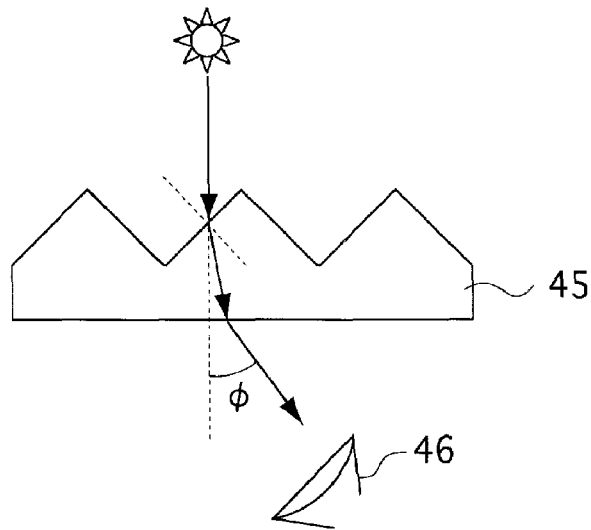
FIG. 9 illustrates a birefringence measurement method for an anisotropic prism sheet.
Figure 10:
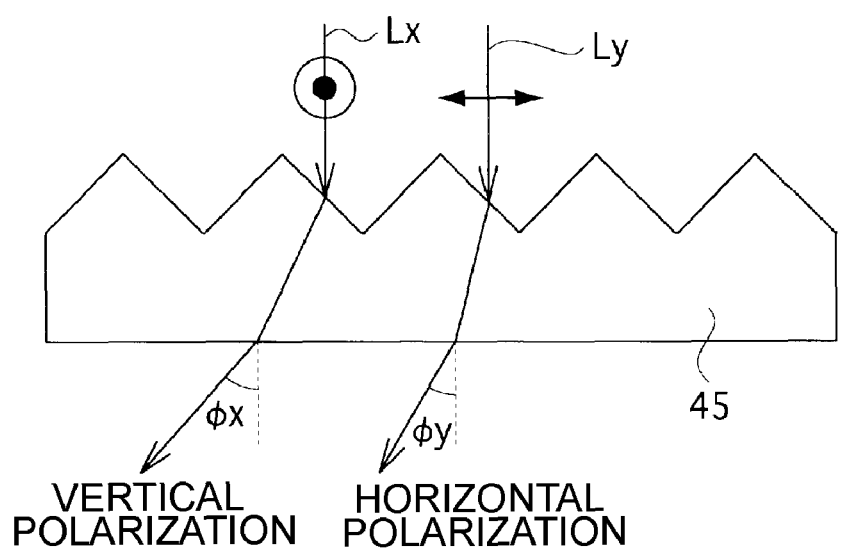
FIG. 10 illustrates the difference in the emission angles of vertically polarized light and horizontally polarized light with respect to an anisotropic prism sheet.

Next, the birefringence of the obtained anisotropic prism sheet was measured. To measure the birefringence, as shown in FIG. 9, polarized light was orthogonally incident on a prism surface of a sheet 45; the transmitted light was detected by a measuring unit 46; and the difference Δn (=nx−ny) of the index of refraction nx in the prism extension direction and the index of refraction ny in the prism alignment direction were calculated on the basis of the difference of the emission angles φ of the transmitted light. In other words, the emission angles φ of the transmitted light differ depending on the incident polarization direction, and, as shown in FIG. 10, the emission angle φx of the polarization component oscillating in a parallel manner in the prism extension direction (hereinafter this is referred to as "vertically polarized light Lx") is greater than the emission angles φy of the polarization component oscillating in a parallel manner in the prism alignment direction (hereinafter this is referred to as "horizontally polarized light Ly"). By employing this, Δn can be calculated.

Figure 11:
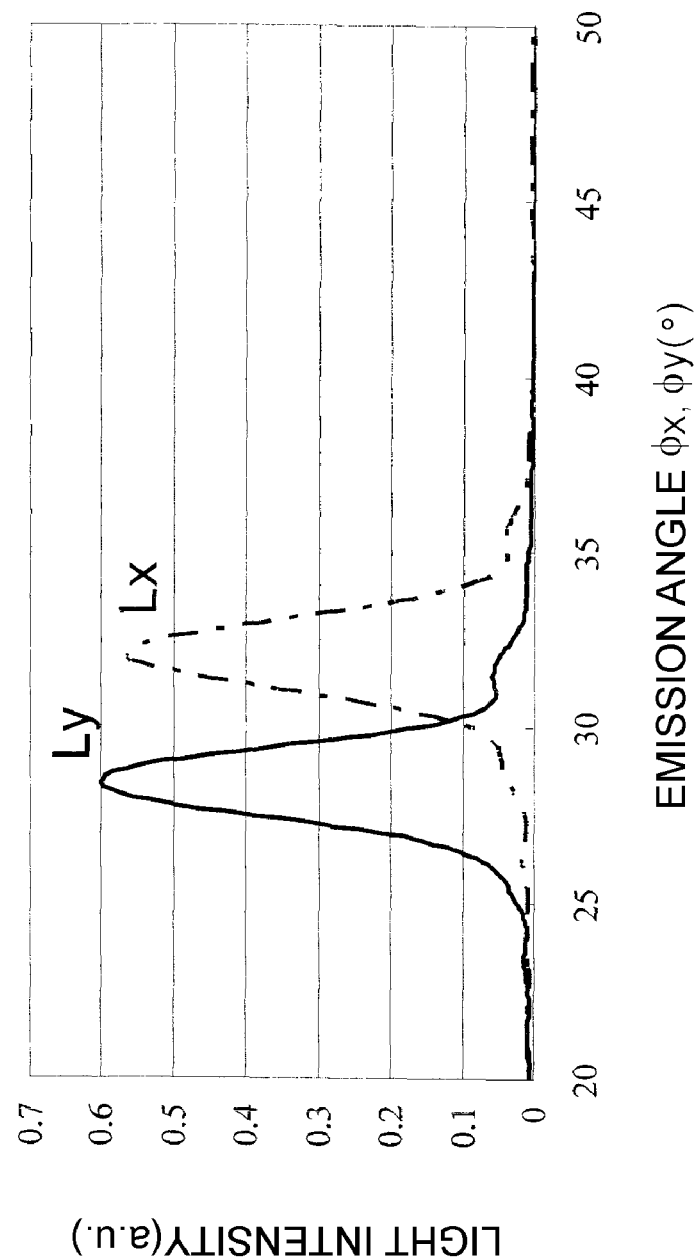
FIG. 11 illustrates the light-transmitting characteristic of the anisotropic prism sheet according to the first example.
Figure 12:
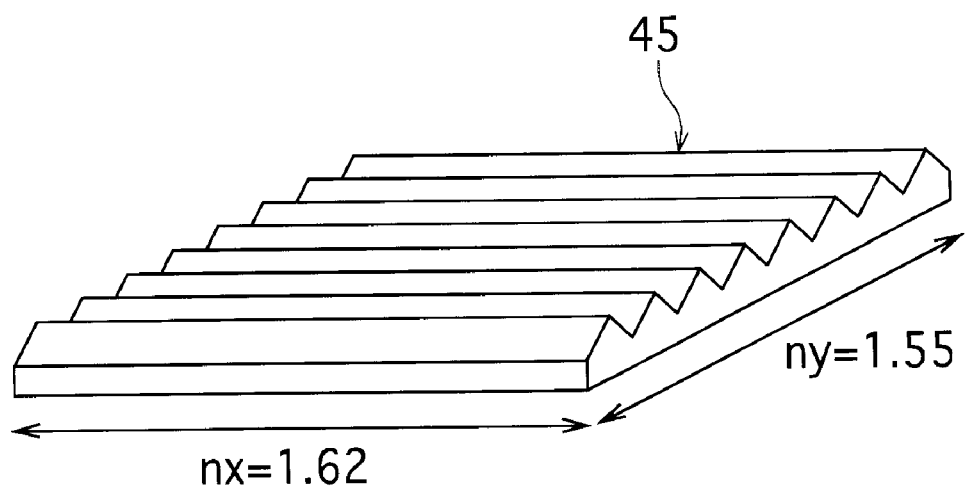
FIG. 12 illustrates the indices of refraction in each in-plane direction of the anisotropic prism sheet according to the first example.

FIG. 11 illustrates the measurement result representing the relationship between the amount of light of the vertically polarized light Lx and the horizontally polarized light Ly transmitted through the sheet 45 and the emission angle. The unit (a.u.) of the vertical axis stands for "arbitrary unit" and is a relative value. As a result of the measurement, as shown in FIG. 12, the index of refraction nx in the prism extension direction of the obtained anisotropic prism sheet 45 is 1.62, whereas the index of refraction ny in the prism alignment direction is 1.55, and Δn is 0.07.

According to this result, after the shape of the prisms is hot pressed onto the A-PET sheet, by uniaxial stretching, an anisotropic prism sheet having different indices of refraction in the prism extension direction and the alignment direction was obtained. Furthermore, as shown in FIG. 11, it can be confirmed that the transmittance of the horizontally polarized light Ly is greater than that of the vertically polarized light Ly. This is because, since the index of refraction nx in the prism extension direction is greater than the index of refraction ny in the prism alignment direction, the total reflection effect of the inclined surface of the prism on the polarization component Lx parallel to the prism extension direction is increased and the amount of light transmitted is reduced compared with Ly.

[Luminance Alignment Evaluation]

Figure 13:
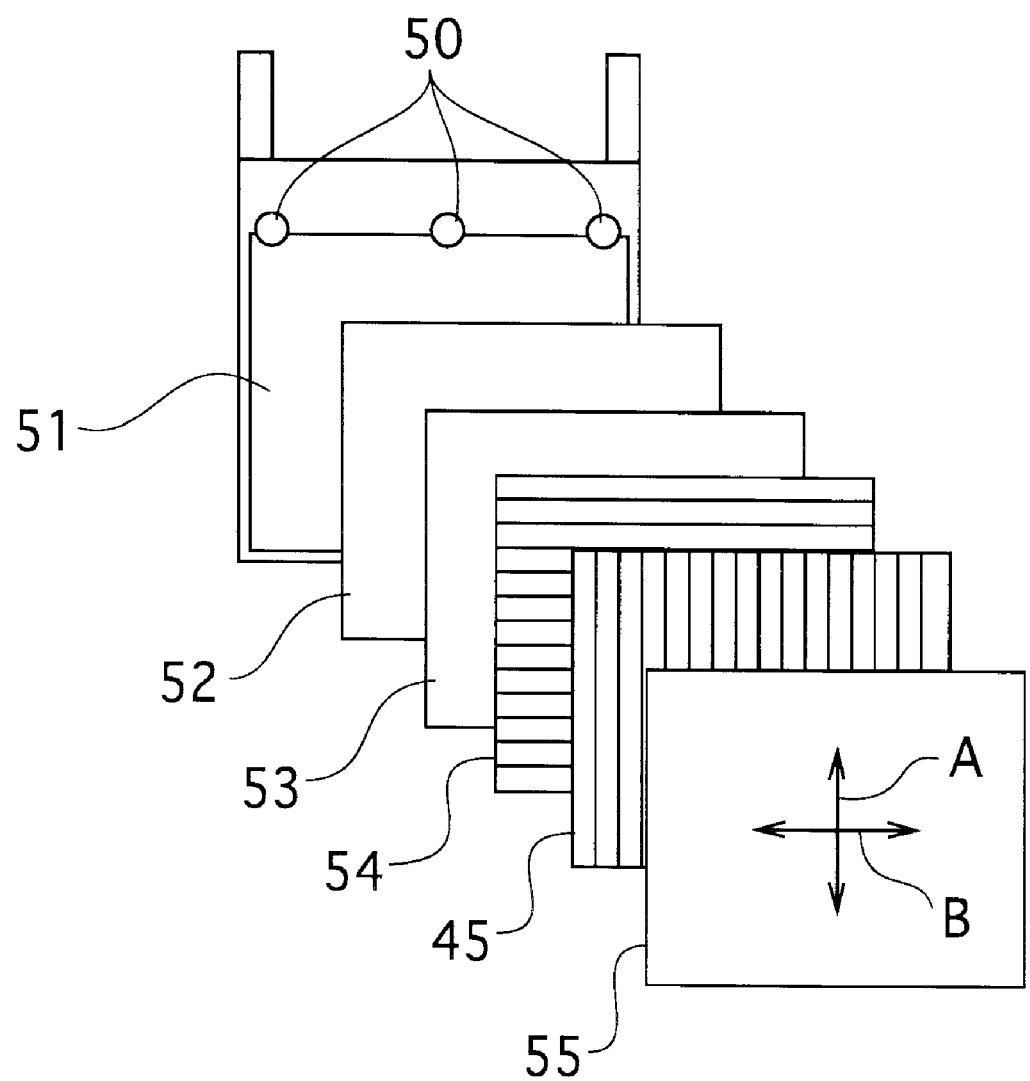
FIG. 13 illustrates the measurement conditions of the luminance characteristic evaluation of the anisotropic prism sheet according to the first example.

Next, the luminance alignment of the anisotropic prism sheet 45 according to this example was measured. As shown in FIG. 13, the backlight unit is an edge light type including a light source 50, a reflector 51, and a light-guiding plate 52. A diffuser 53, a luminance-improvement film 54, an anisotropic prism sheet 45, and a polarizer 55 are stacked on the light-guiding plate 52 in the respective order. The front luminance and the illuminance were measured using a luminance colorimeter (EZ-contrastXL88 manufactured by ELDIM).

An isotropic prism sheet (for example, BEF (trademark) manufactured by 3M Company) was used as the luminance-improvement film 54, and the prism extension direction was disposed in the left and right direction in the drawing (horizontal direction). The anisotropic prism sheet 45 was disposed with the prism extension direction in the up and down direction in the drawing (vertical direction), and the prism extension direction was disposed orthogonal to the luminance-improvement film 54. Two polarizers 55 were provided: one having a light-transmission axis A in the vertical direction: and the other having a light-transmission axis B in the horizontal direction. Both polarizers 55 were used to measure the luminance alignment of the vertically polarized light and the horizontally polarized light.

First Comparative Example

The same method was applied to measure the front luminance and the illuminance as that of the first example, except that, instead of the anisotropic prism sheet 45, a unstretched anisotropic prism sheet (90 degrees prism apex angle and 50 μm pitch) was used.

Figure 14:
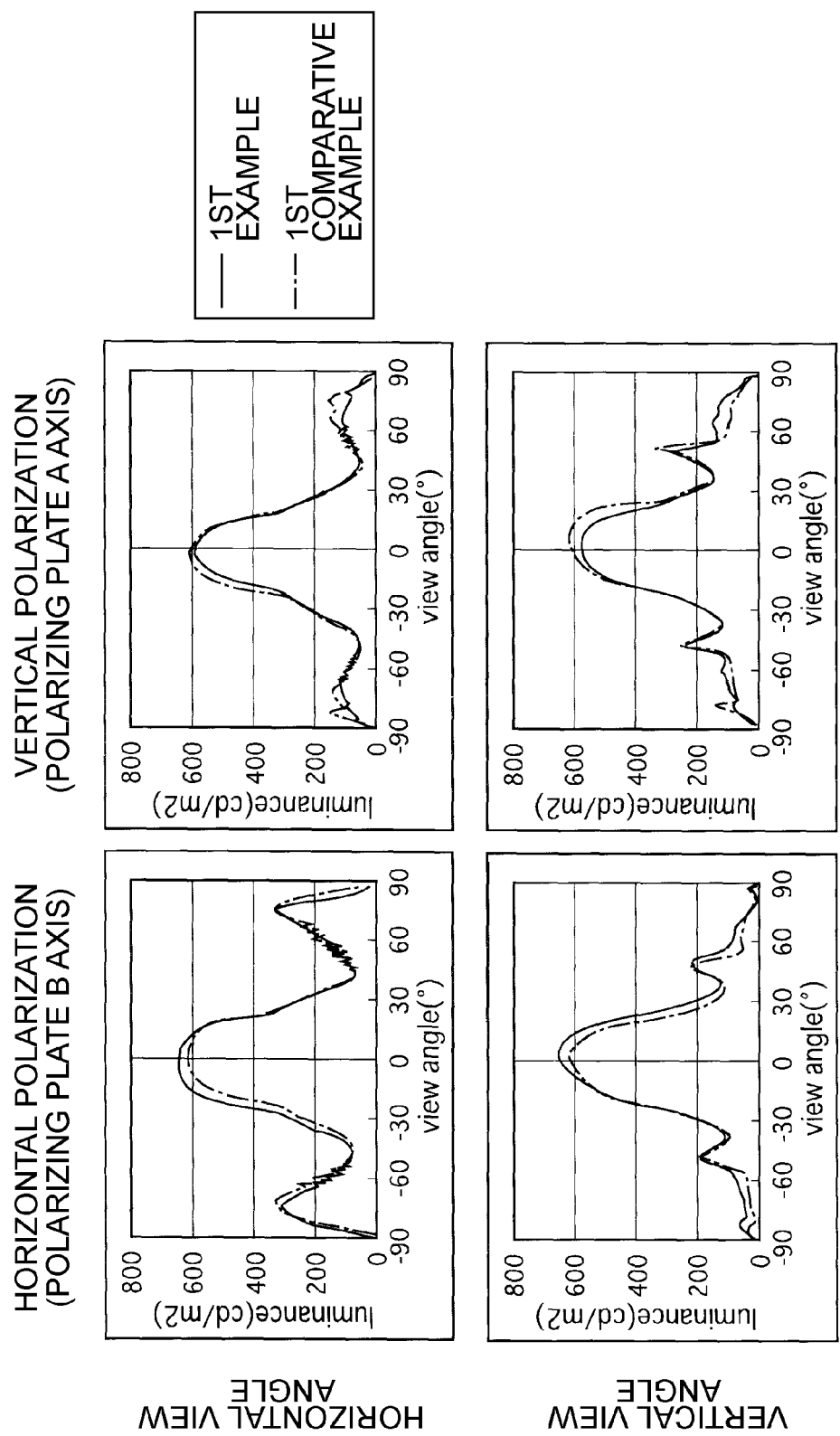
FIG. 14 illustrates the evaluation results of the luminance characteristic evaluation of the anisotropic prism sheet according to the first example.

The measurement results are shown in Table 1 and FIG. 14.

According to the results shown in Table 1 and FIG. 14, both the front luminance and the illuminance of the vertically polarized light of the anisotropic prism sheet according to this example were decreased compared with the anisotropic prism sheet according to the first comparative example. However, the luminance and the illuminance of the horizontally polarized light were increased compared with the anisotropic prism sheet according to the first comparative example.

According to the results described above, with the anisotropic prism sheet, since a larger amount of vertically polarized light is reflected at the prism surface and is recycled as light in all directions by the diffuser and the reflector, it contributes to an increase in the luminance and illuminance of the horizontally polarized light. Therefore, by setting the transmission axis of the polarizer 55 in the direction of the horizontally polarized light, i.e., the prism alignment direction of the anisotropic prism sheet 45, light can be efficiently used and the front luminance and the illuminance (light extraction efficiency) can be improved.

Second Example

Forming Prism Sheet

As an original metal embossed plate for hot press for transferring the prism shape to the resin film, a plate was used with surface engraved in a manner such that the cross-section includes right isosceles triangles, with apex angles of 90 degrees, regularly and continuously arranged adjacent and parallel to each other so that the distance between a projecting portion and an adjacent projecting portion and the distance between a concave portion and an adjacent projecting portion are both 50 μm. The resin film was thermoplastic resin, and a 200-μm thick amorphous PEN (A-PEN) sheet (Tg approximately 120° C.) was used. This resin film was hot pressed at 150° C. for 10 minutes at 100 kgf/cm2 (9.8 Mpa), and immediately after pressing, ice water was added to obtain a transparent isotropic prism sheet.

[Stretching Prism Sheet]

The obtained isotropic prism sheet was cut into an 8 cm long (in the prism extension direction) and 5 cm wide rectangle. Then, the triangular cross-sections (prism cross-sections) at both edges in the longitudinal direction were held with a manual stretching machine, and an anisotropic prism sheet was obtained by carrying out uniaxial stretching at a stretching speed of 1 cm/sec so that the center of the sample is stretched in the stretching by 3.5 times in an environment of 140° C.

TABLE 1

First Example

| | Front luminance (cd/m2) | | Illuminance (lux) | | Change rate (example/ comparative example) | |
|---|---|---|---|---|---|---|
| | 1st example | 1st comparative example | 1st example | 1st comparative example | 1st example | 1st comparative example |
| Horizontally polarized light | 667 | 622 | 626 | 532 | 107% | 118% |
| Vertically polarized light | 579 | 627 | 501 | 562 | 92% | 89% |

The triangular cross-sections of the obtained anisotropic prism sheet and the unstretched isotropic prism sheet were measured using a surface roughness meter (Surfcoder ET4001A manufactured by Kosaka Laboratory Ltd.). As a result, both sheets included right isosceles triangles having a 45-degrees base angle that is the same as the original plate. Furthermore, the prism of the sample before stretching was approximately a 50 μm pitch, which is the same as the original plate, whereas the prism sample after stretching was approximately a 30 μm pitch.

Figure 15:
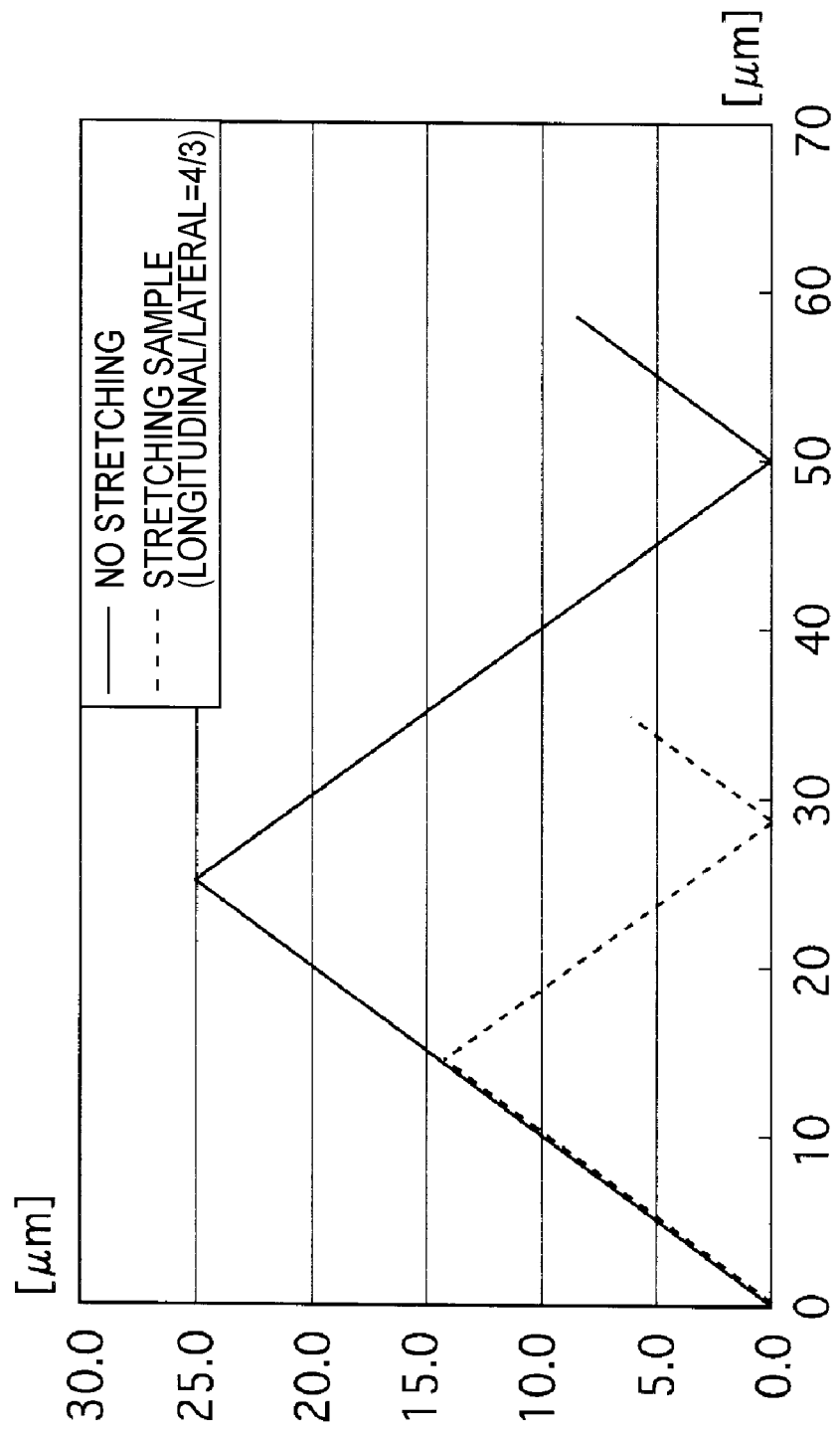
FIG. 15 illustrates the result of measuring the cross-sectional shape of an anisotropic prism sheet described in a second example according to an embodiment.

FIG. 15 illustrates a schematic cross-sectional view of the prism sheet after stretching. In the drawing, the chain dotted line represents the cross-sectional shape of the sample before stretching, and the solid line represents the cross-sectional shape of the sample after stretching. It can be noticed that the shapes of the prism are similar before and after stretching.

Next, the birefringence of the obtained anisotropic prism sheet was measured. The birefringence was measured in the same way as in the first example.

Figure 16:
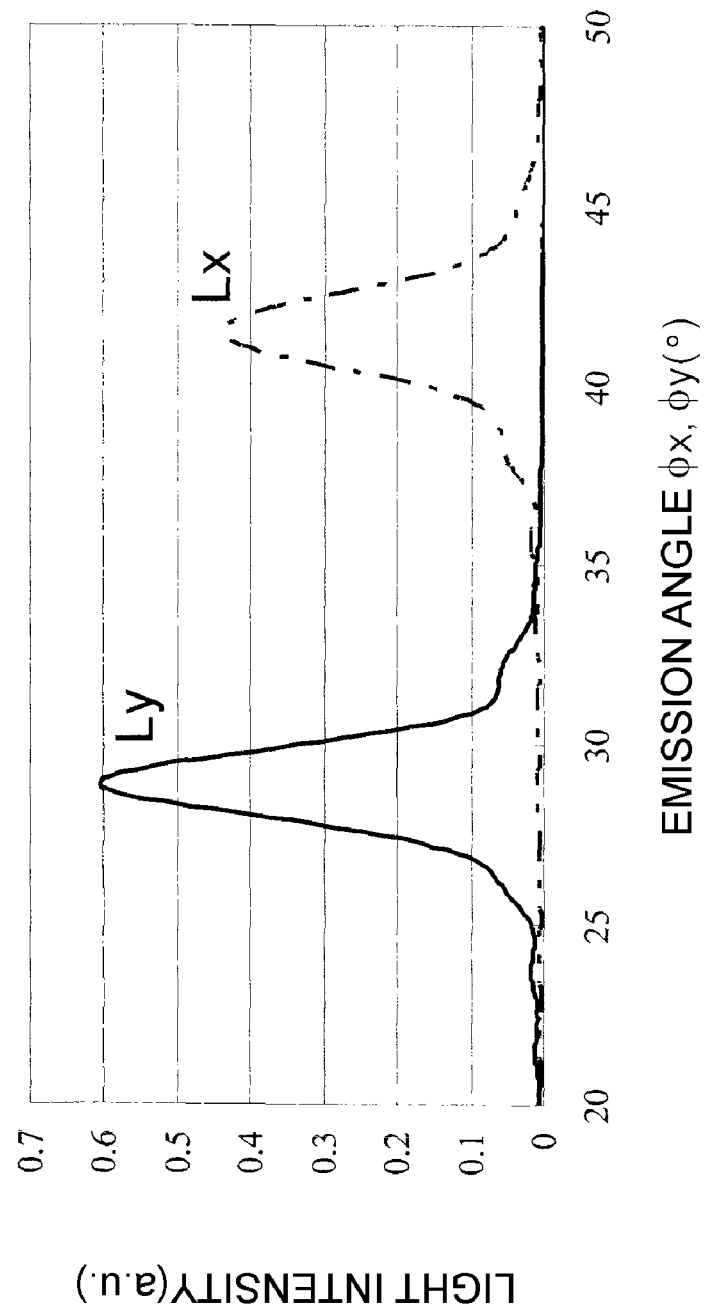
FIG. 16 illustrates the light-transmitting characteristic of the anisotropic prism sheet according to the second example.
Figure 17:
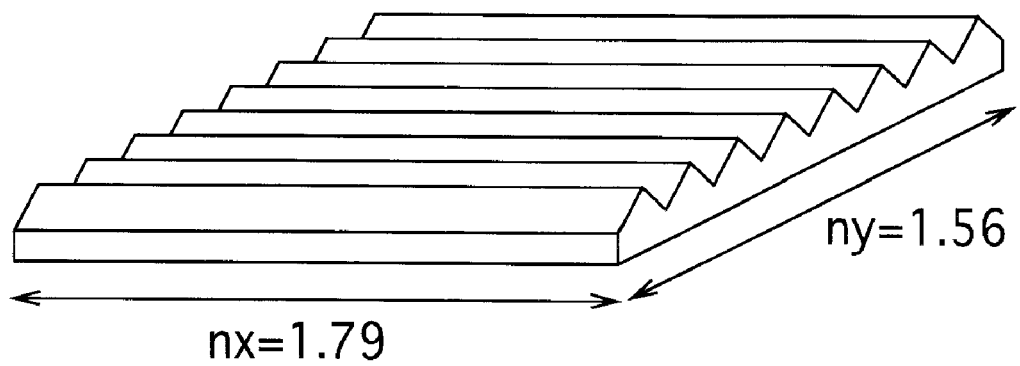
FIG. 17 illustrates the indices of refraction in each in-plane direction of the anisotropic prism sheet according to the second example.

FIG. 16 illustrates the measurement result representing the relationship between the amount of light of the vertically polarized light Lx and the horizontally polarized light Ly transmitted through the anisotropic prism sheet and the emission angle. The unit (a.u.) of the vertical axis stands for "arbitrary unit" and is a relative value. As a result of the measurement, as shown in FIG. 17, the index of refraction nx in the prism extension direction of the obtained anisotropic prism sheet is 1.79, whereas the index of refraction ny in the prism alignment direction is 1.56, and Δn is 0.23.

According to this result, after the shape of the prisms is hot pressed onto the A-PEN sheet, by uniaxial stretching, an anisotropic prism sheet having different indices of refraction in the prism extension direction and the alignment direction was obtained. Furthermore, as shown in FIG. 16, it can be confirmed that the transmittance of the horizontally polarized light Ly is greater than that of the vertically polarized light Ly. This is because, since the index of refraction nx in the prism extension direction is greater than the index of refraction ny in the prism alignment direction, the total reflection effect of the inclined surface of the prism on the polarization component Lx parallel to the prism extension direction is increased and the amount of light transmitted is reduced compared with Ly.

[Luminance Alignment Evaluation]

Next, the luminance alignment of the anisotropic prism sheet according to this example was measured. As shown in FIG. 13, the backlight unit is an edge light type including a light source 50, a reflector 51, and a light-guiding plate 52. A diffuser 53, a luminance-improvement film 54, an anisotropic prism sheet 45, and a polarizer 55 are stacked on the light-guiding plate 52 in the respective order. The front luminance and the illuminance was measured using a luminance colorimeter (EZ-contrastXL88 manufactured by ELDIM).

An isotropic prism sheet (for example, BEF (trademark) manufactured by 3M Company) was used as the luminance-improvement film 54, and the prism extension direction was disposed in the left and right direction in the drawing (horizontal direction). The anisotropic prism sheet 45 was disposed with the prism extension direction in the up and down direction in the drawing (vertical direction), and the prism extension direction was disposed orthogonal to the luminance-improvement film 54. Two polarizers 55 were provided: one having a light-transmission axis A in the vertical direction: and the other having a light-transmission axis B in the horizontal direction. Both polarizers 55 were used to measure the luminance alignment of the vertically polarized light and the horizontally polarized light.

Second Comparative Example

The same method was applied to measure the front luminance and the illuminance as that of the second example, except that, instead of the anisotropic prism sheet 45, a unstretched anisotropic prism sheet (90 degrees prism apex angle and 50 μm pitch) was used.

Figure 18:
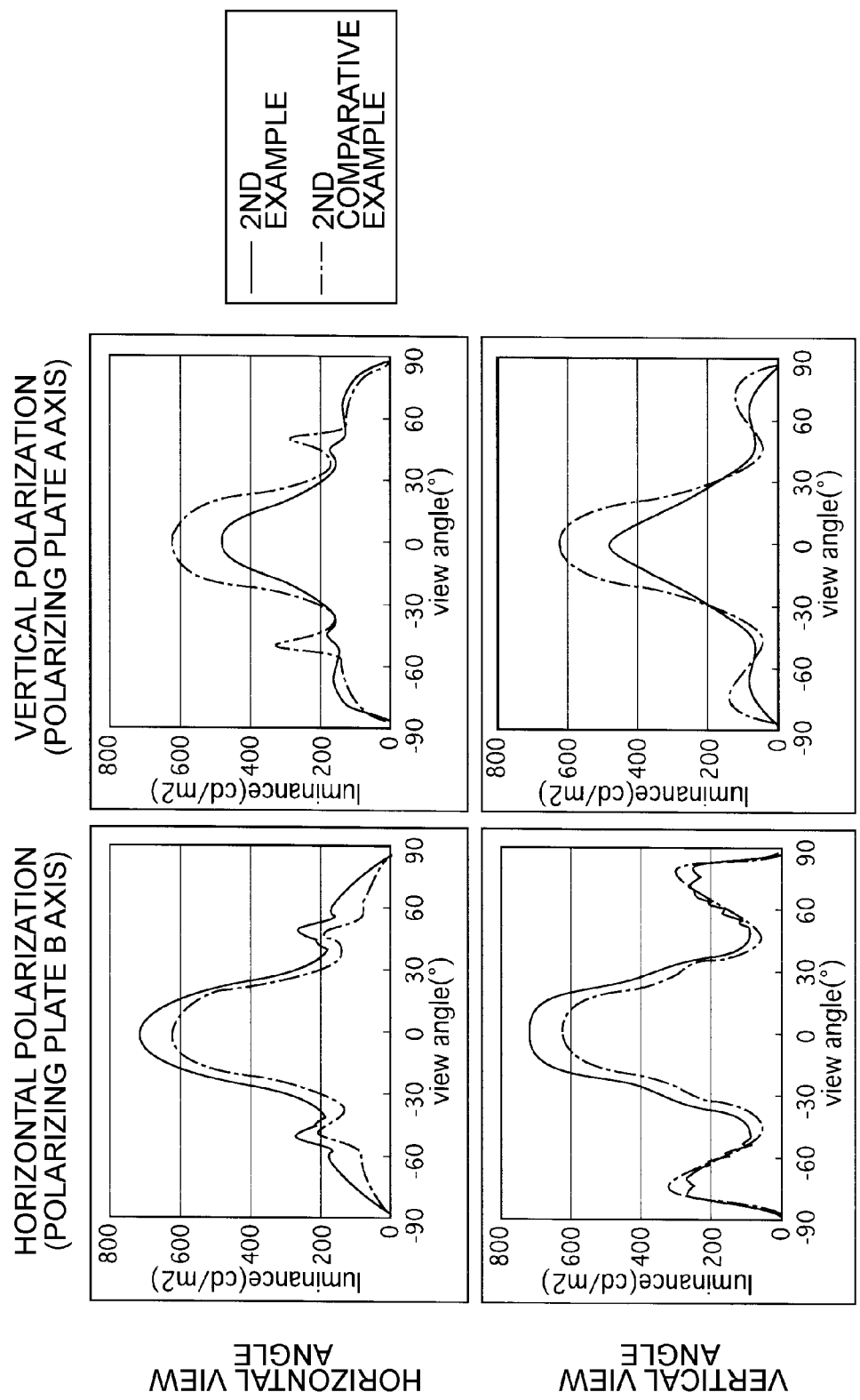
FIG. 18 illustrates the evaluation results of the luminance characteristic evaluation of the anisotropic prism sheet according to the second example.

The measurement results are shown in Table 2 and FIG. 18.

TABLE 2

| | Second Example | | | | | |
|---|---|---|---|---|---|---|
| | Front luminance (cd/m2) | | Illuminance (lux) | | Change rate (example/comparative example) | |
| | 2nd example | 2nd comparative example | 2nd example | 2nd comparative example | 2nd example | 2nd comparative example |
| Horizontally polarized light | 714 | 622 | 684 | 532 | 115% | 129% |
| Vertically polarized light | 482 | 627 | 468 | 562 | 77% | 83% |

According to the results shown in Table 2 and FIG. 18, both the front luminance and the illuminance of the vertically polarized light of the anisotropic prism sheet according to this example were decreased compared with the anisotropic prism sheet according to the second comparative example. However, the luminance and the illuminance of the horizontally polarized light were increased compared with the anisotropic prism sheet according to the second comparative example.

According to the results described above, with the anisotropic prism sheet, since a larger amount of vertically polarized light is reflected at the prism surface and is recycled as light in all directions by the diffuser and the reflector, it contributes to an increase in the luminance and illuminance of the horizontally polarized light. Therefore, by setting the transmission axis of the polarizer 55 in the direction of the horizontally polarized light, i.e., the prism alignment direction of the anisotropic prism sheet 45, light can be efficiently used and the front luminance and the illuminance (light extraction efficiency) can be improved.

Third Example

When the prism sheet according to an embodiment is used for a liquid crystal display apparatus, the angle formed by the prism sheet and the transmission axis of polarizer (the polarizer disposed on the light incident side of the liquid crystal display panel. Hereinafter, this is the same) becomes important. As shown in the first and second examples, the polarization of the light emitted from the prism sheet is biased, and it is preferable to match the transmission axis of the polarizer to a direction corresponding to the bias. However, the present invention can be employed even when the transmission axis of the polarizer cannot be matched because of reasons such as improving the contrast of the liquid crystal display apparatus or suppressing moire.

According to this example, front luminance of a liquid crystal display apparatus was measured at an angle formed by the prism alignment direction and the direction of the light-transmission axis of the polarizer when a prism sheet, such as that according to the second example, having a greater index of refraction in the prism extension direction than the index of refraction in the prism alignment direction was used for the liquid crystal display apparatus.

Third Comparative Example

The same method was applied to measure the front luminance and the illuminance as that of the third example, except that, instead of the anisotropic prism sheet, a non-stretched anisotropic prism sheet (90 degrees prism apex angle and 50 μm pitch) was used.

Figure 19:
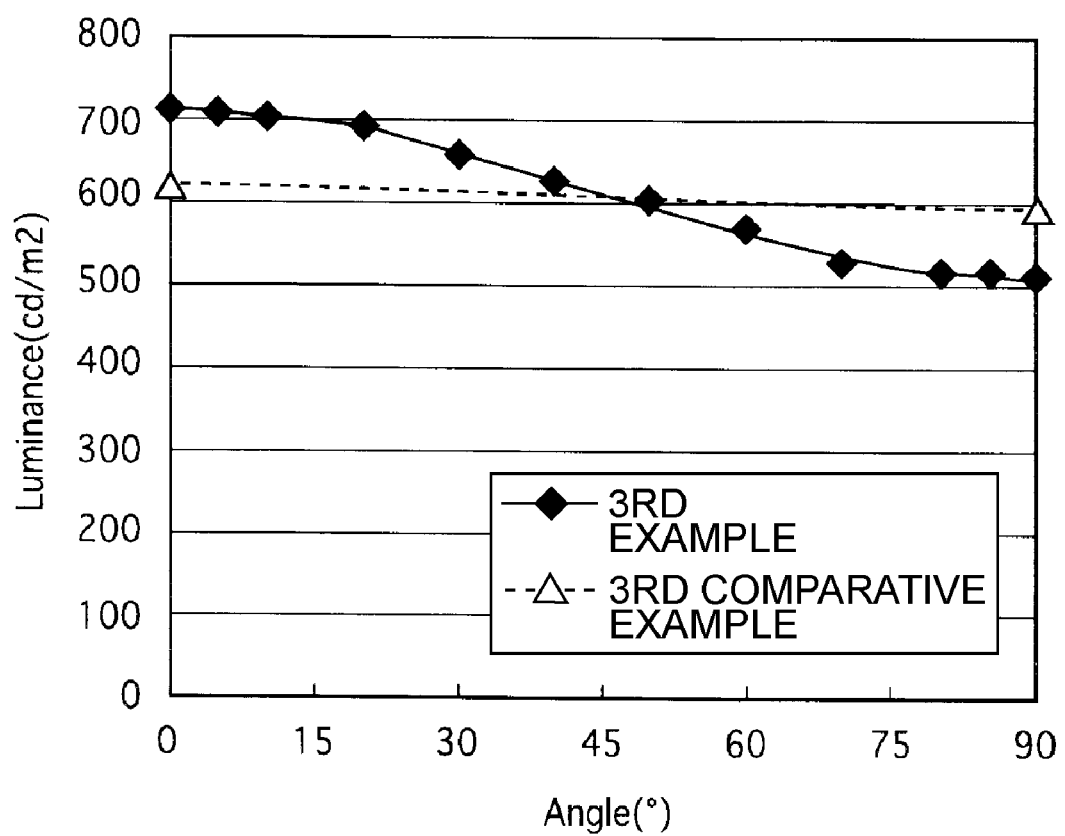
FIG. 19 illustrates the angular dependency characteristic of luminance with respect to a polarizer of the anisotropic prism sheet described in a third example.

The measurement results are shown in FIG. 19. According to the results in FIG. 19, when the angle formed by the prism alignment direction of the prism sheet and the direction of the light-transmission axis of the polarizer is from 0° to 45°, the front luminance can be increased compared with an anisotropic prism sheet, and it is more preferable when the angle be from 0° to 20°.

Opposite to a case in which the index of refraction in the prism extension direction is greater than the index of refraction in the prism alignment direction, as according to this example, when the prism sheet is produced so that the index of refraction in the prism alignment direction is greater than the index of refraction in the prism extension direction, if the angle formed by the prism extension direction and the direction of the light-transmission axis of the polarizer is from 0° to 45°, the front luminance can be increased compared with an anisotropic prism sheet, and it is more preferable when the angle be from 0° to 20°.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

The invention is claimed as follows:

1. A light-transmitting film comprising:
a light emission surface having a surface structure with prisms continuously disposed thereon,
wherein each of the prisms has an index of refraction in an extension direction of the prisms, and an index of refraction in an alignment direction of the prisms which are different from each other.

2. The light-transmitting film according to claim 1, wherein the index of refraction in the extension direction of the prisms and the index of refraction in the alignment direction of the prisms have a difference of 0.07 or more.

3. The light-transmitting film according to claim 1, wherein the index of refraction in the extension direction of the prisms is greater than the index of refraction in the alignment direction of the prisms.

4. The light-transmitting film according to claim 1, wherein the index of refraction in the extension direction of the prisms is less than the index of refraction in the alignment direction of the prisms.

5. The light-transmitting film according to claim 1, wherein each of the prisms includes a pair of inclined surfaces.

6. The light-transmitting film according to claim 5, wherein each of the prisms reflects, regarding partial light incident on a light incident surface from an oblique direction, to the light incident surface side a polarization component in one of the extension direction of the prisms and the alignment direction of the prisms that has a larger index of refraction while causing a polarization component in another one of the extension direction of the prisms and the alignment direction of the prisms that has a smaller index of refraction to transmit therethrough.

7. The light-transmitting film according to claim 6, wherein light incident on the light incident surface from a vertical direction to the light incident surface side is reflected regardless of a polarization state.

8. The light-transmitting film according to claim 1, wherein each of the prisms has a cross-section of an isosceles triangle having an apex angle of 90°.

9. The light-transmitting film according to claim 1, wherein the light-transmitting film is constituted of a co-polymer selected from a group consisting of polyethylene terephthalate (PET), polyethylene naphthalate (PEN), a PET-PEN mixture, and a PET-PEN co-polymer.

10. The light-transmitting film according to claim 1,
wherein when the index of refraction in the prism extension direction is greater than the index of refraction in the prism alignment direction, and
wherein when light is incident on a flat light incidence surface of the light-transmitting film at a determined angle, a prism extension direction polarization component of the light that is emitted from the light emission surface is emitted at a higher angle than a prism alignment direction polarization component of the light that is also emitted from the light emission surface.

11. The light-transmitting film according to claim 1, wherein when the index of refraction in the prism extension direction is greater than the index of refraction in the prism alignment direction, and when an angle of light incident on a flat light incidence surface of the light-transmitting film satisfies a predetermined range of angles, a complete polarization split state is achieved in which:
a prism extension direction polarization component of the light is totally reflected at inclined surfaces of the prisms, and
a prism alignment direction polarization component of the light is totally transmitted through the prisms.

12. A method of forming a light-transmitting film including a light incident surface and a light emission surface, the method comprising:
forming a resin film having prisms continuously disposed on one surface; and
stretching, after the formation of the resin film, the resin film in the extension direction of the prisms to generate a difference between an index of refraction in the extension direction of the prisms and an index of refraction in the alignment direction of the prisms.

13. The method of forming a light-transmitting film according to claim 12, wherein the resin film is constituted of a material having a smaller index of refraction in the extension direction of the prisms than in the alignment direction of the prisms.

14. The method of forming a light-transmitting film according to claim 12, wherein the resin film is constituted of a material having a larger index of refraction in the extension direction of the prisms than in the alignment direction of the prisms.

15. The light-transmitting film according to claim 14, wherein when light is incident on a flat light incidence surface of the light-transmitting film at a determined angle, a prism extension direction polarization component of the light that is emitted from the light emission surface is emitted at a higher angle than a prism alignment direction polarization component of the light that is also emitted from the light emission surface.

16. The light-transmitting film according to claim 14, wherein when an angle of light incident on a flat light incidence surface of the light-transmitting film satisfies a predetermined range of angles, a complete polarization split state is achieved in which:
a prism extension direction polarization component of the light is totally reflected at inclined surfaces of the prisms, and
a prism alignment direction polarization component of the light is totally transmitted through the prisms.

17. A liquid crystal display apparatus comprising:
a liquid crystal display panel;
a pair of polarizers sandwiching the liquid crystal display panel;
a light source illuminating the liquid crystal display panel; and
a light-transmitting film interposed between the liquid crystal display panel and the light source, the light-transmitting film including a light incident surface and a light emission surface having a surface structure with prisms continuously disposed therein,
wherein each of the prisms has an index of refraction in an extension direction of the prisms, and an index of refraction in an alignment direction of the prisms which are different from each other.

18. The liquid crystal display apparatus according to claim 17,
wherein the light-transmitting film is formed such that the index of refraction in the extension direction of the prisms is larger than the index of refraction in the alignment direction of the prisms, and
wherein an angle formed between the alignment direction of the prisms and a direction of a light-transmission axis of one of the pair of polarizers that is disposed on a light incident side of the liquid crystal display panel ranges from 0° to 45°.

19. The liquid crystal display apparatus according to claim 17,
wherein the light-transmitting film is formed such that the index of refraction in the alignment direction of the prisms is larger than the index of refraction in the extension direction of the prisms, and
wherein an angle formed between the extension direction of the prisms and a direction of a light-transmission axis of one of the pair of polarizers that is disposed on a light incident side of the liquid crystal display panel is ranges from 0° to 45°.

20. The liquid crystal display apparatus according to claim 17, wherein the light-transmitting film is constituted of a co-polymer selected from a group consisting of polyethylene terephthalate (PET), polyethylene naphthalate (PEN), a PET-PEN mixture, and a PET-PEN co-polymer.

* * * * *